United States Patent

Kosokabe et al.

[11] Patent Number: 5,747,399
[45] Date of Patent: May 5, 1998

[54] GLASS FOR A FLUORESCENT LAMP

[75] Inventors: Hiroyuki Kosokabe; Koichi Hashimoto, both of Shiga, Japan

[73] Assignee: Nippon Electric Glass Co., Ltd., Otsu, Japan

[21] Appl. No.: 711,804

[22] Filed: Sep. 10, 1996

[30] Foreign Application Priority Data

Sep. 14, 1995 [JP] Japan .................................. 7-262350
Oct. 9, 1995 [JP] Japan .................................. 7-287939

[51] Int. Cl.$^6$ .............................. C03C 3/093; C03C 4/12
[52] U.S. Cl. .............................. 501/67; 501/61; 501/62; 501/66
[58] Field of Search .................. 501/61, 62, 66, 501/67

[56] References Cited

U.S. PATENT DOCUMENTS 4,342,553  8/1982  Graff et al. .................. 501/66
4,666,871  5/1987  Spierings et al. .................. 501/62

Primary Examiner—Karl Group
Attorney, Agent, or Firm—Collard & Roe, P.C.

[57] ABSTRACT

In order to provide a glass which can be sealed to tungsten and Kovar and has a solarization resistance against the ultraviolet ray, and which is adaptable for use in a fluorescent lamp of a reduced size used as a light source for a lighting device in a liquid crystal display (13). The glass for use in a fluorescent lamp which consists essentially, by weight, of $SiO_2$ 55–79%, $B_2O_3$ 12.5–25%, $Al_2O_3$ 0.5–10% $Li_2O+Na_2O+K_2O$ 1–16%, $ZrO_2$ 0.01–5%, $TiO_2+PbO+Sb_2O_3$ 0.05–11%.

6 Claims, No Drawings

GLASS FOR A FLUORESCENT LAMP

BACKGROUND OF THE INVENTION

The present invention relates to a glass for a glass tube of a fluorescent lamp, and more particularly, to a glass which is used for a light source in a lighting device for a liquid crystal display (LCD).

The LCD is roughly classified into a light deflective LCD and a light transmissive LCD. The former uses natural rays or room light for lighting the display image and is mainly used for a low power consumption device such as a watch, a compacted-electronic calculator or the like.

On the other hand, the light transmissive LCD has an exclusive light source such as a backlight device and is mainly used for utilities required for high quality information display, such as a color display of active matrix LCD or the like.

The backlight device has a fluorescent lamp as the light source which is similar to a conventional fluorescent lamp for a household lighting fixture except that a glass tube is small in diameter and in glass wall thickness.

In the fluorescent lamp for the backlight device, lead-soda-silicate glass is conventionally used as the glass tube and is sealed with lead wires made of dumet.

Recently, the fluorescent lamp for the backlight is required to be small-sized as the LCD is reduced in size, weight, and power consumption. The small-size of the fluorescent lamp accompanies a lowered mechanical strength of structure and an increased heat generation. Therefore, the glass tube used therein needs to have a high strength and a low thermal expansion.

On the other hand, a drive circuit with a high frequency becomes used for improving an efficiency of luminance. This requires the glass tube having a low dielectric loss.

However, the conventional lead-soda-silicate glass hardly satisfies those requirements.

Accordingly, it has been studied to make the fluorescent lamp by use of a glass tube made of hard borosilicate glass which is high in thermal and mechanical strength and low in the dielectric loss in comparison with the lead-soda-silicate glass. As a result, a fluorescent lamp has been developed and commercialized which comprises a glass tube of a hard borosilicate glass for tungsten sealing and tungsten wires. The tungsten sealing glass used therein is one which has conventionally been used for xenon flash light lamp.

Another approach was to use as a glass tube a hard borosilicate glass for Fe—Ni—Co alloy (Kovar) sealing. The glass has conventionally been used as sealing glass or lenses in various electron tubes and photocaps.

In either of those fluorescent lamps, the borosilicate glass tube is subjected to so called the ultraviolet ray solarization, that is, exposed to the ultraviolet ray irradiated from a mercury gas activated in the tube to thereby be discolored. As a result, the fluorescent lamp becomes low in the luminance and changes in color of the radiating light. This degrades the screen brightness and the color rendering properties of the LCD.

In order to resolve the solarization problem, an ultraviolet ray reflection or absorption layer of $Al_2O_3$ or $TiO_2$ is coated on the inner surface of the glass tube to protect the glass tube from the ultraviolet ray, with the fluorescent film being coated onto the protection layer. However, this results in increase of the production cost of the fluorescent lamp. In view of the further reduction of glass tube size, it is difficult to homogeneously form the multilayer of the protective layer and the fluorescent film.

SUMMARY OF THE INVENTION

Accordingly, it is an object of the present invention to provide a glass which can be sealed to tungsten and Kovar and has a solarization resistance against the ultraviolet ray, and which is adaptable for use in a fluorescent lamp of a reduced size used as a light source for a lighting device in a LCD.

According to the present invention, there is provided a glass for use in a fluorescent lamp which consists essentially, by weight, of $SiO_2$ 55–79%, $B_2O_3$ 12.5–25%, $Al_2O_3$ 0.5–10%, $Li_2O+Na_2O+K_2O$ 1–16%, $ZrO_2$ 0–5%, $TiO_2+PbO+Sb_2O_3$ 0.05–11%.

The glass is adaptable for a glass tube of a fluorescent lamp in a light device implemented in a LCD.

DESCRIPTION OF PREFERRED EMBODIMENTS

The present invention attempts to provide a glass used for the glass tubes of fluorescent lamps which are used for the light sources in the backlight devices of the LCD.

The glass used for the fluorescent lamp according to the present invention is a hard borosilicate glass which consists essentially, by weight, of $SiO_2$ 55–79%, $B_2O_3$ 12.5–25%, $Al_2O_3$ 0.5–10%, $Li_2O+Na_2O+K_2O$ 1–16%, $ZrO_2$ 0–5%, $TiO_2+PbO+Sb_2O_3$ 0.05–11%.

The hard glass has a linear coefficient of thermal expansion (CTE) of $34-55 \times 10^{-7}/°C$. (at 30°–380° C.) which is matched with that of tungsten metal or Kovar alloy. Furthermore, the hard glass has an excellent solarization resistance of ultraviolet rays.

When the hard glass is used for a fluorescent lamp which uses lead wires made of tungsten, the hard glass, preferably, consists essentially, by weigh, of $SiO_2$ 73–79%, $B_2O_3$ 12.5–25%, $Al_2O_3$ 0.5–10%, $Li_2O+Na_2O+K_2O$ 1–11%, $ZrO_2$ 0.01–5%, $TiO_2+PbO+Sb_2O_3$ 0.05–11%, wherein a CTE is $34-43 \times 10^{-7}/°C$. at 30°–380° C.

The following is the reason why the contents are limited as mentioned above.

$SiO_2$ is a network former. The content of $SiO_2$ is 73 to 79%, preferably, 73–78%. When the content of $SiO_2$ is more than 79%, a CTE becomes too low and the glass becomes too difficult to be melted. When the contents of $SiO_2$ is less than 73%, the CTE becomes high for sealing tungsten, and chemical durability tends to lower. The glass is thereby often weathered to result in lowering a luminance of the fluorescent lamp.

$B_2O_3$ is an ingredient required to make easy melt and adjust a viscosity of the glass, the amount of which is 12.5–25%, preferably, 14–22%. When the content of $B_2O_3$ is more than 25%, viscosity becomes too low. Further, homogeneous glass can not be obtained owing to vaporization of $B_2O_3$, and chemical durability becomes worse. When the content of $B_2O_3$ is less than 12.5%, melting becomes difficult and viscosity is too high to seal with tungsten metal.

$Al_2O_3$ is an ingredient for stabilizing the glass, the content of which is 0.5–10%, preferably, 1–2.2%. When the content of $Al_2O_3$ is more than 10%, the glass becomes too difficult to be melted. When the content of $Al_2O_3$ is less than 0.5%, the liquidus temperature is excessively high so that homogeneous glass can hardly be produced. Moreover, chemical durability becomes low.

Alkali metal oxide, such as $Li_2O$, $Na_2O$, and $K_2O$, are ingredients for making the glass easy melt and for adjusting the CTE and the viscosity. The total content of alkali metal oxides is 1 to 11%, preferably, 5.1–9%. When the total content of alkali metal oxides is more than 11%, the CTE is too high to seal the tungsten metal and chemical durability becomes extremely low. When the total content is less than 1%, the CTE is too low.

With reference to each of alkali metal oxides, $Li_2O$ is 0 to 4%, preferably, 0–2%, $Na_2O$ is 0–10%, preferably, 0–5.9%, $K_2O$ is 0–10%, preferably, 0–4%.

When the content of $Li_2O$ is more than 4%, the liquidus temperature and the CTE are too high. When the content of $Na_2O$ is more than 10%, $Na^+$ ion contaminates a fluorescent substance in a heating process of manufacturing the fluorescent lamp to lower the luminance of the lamp and the CTE becomes too high.

When the content of $K_2O$ is more than 10%, the CTE becomes too high.

$ZrO_2$ is an ingredient to improve the chemical durability, the content of which is 0.01–5%, preferably, 0.1–3%. When the content of $ZrO_2$ is more than 5%, the liquidus temperature is high so that homogeneous glass can not be obtained. Furthermore, accuracy of dimension of the glass tube becomes worse to cause a defect of appearance occurs, so that the high-quality of glass tube can not be obtained.

On the other hand, when the content of $ZrO_2$ is less than 0.01%, the chemical durability becomes worse to cause the weathering to make it impossible to homogeneously apply the fluorescent substance layer.

$TiO_2$, PbO, and $Sb_2O_3$ are ingredients which give the glass a high solarization resistance against ultraviolet rays. A total content of $TiO_2$, PbO, and $Sb_2O_3$ is 0.05–11%, preferably, 0.1–5.5%. When the total content is more than 11%, an influence of devitrification and vaporization is strengthened to make it impossible to obtain the homogeneous glass tube with a dimensional accuracy.

On the other hand, when the total content is less than 0.05%, the solarization resistance can not be obtained.

When $TiO_2$ should be contained in the glass, $TiO_2$ is of 0.05–5%, preferably, 0.1–3%, PbO is of 0–10%, preferably, 0–5.5%, and $Sb_2O_3$ is of 0–4%, preferably; 0–1%.

When PbO should be contained in the glass, $TiO_2$ is of 0–5%, preferably, 0–2%, PbO is of 0.05–10%, preferably 0.1–5.5%, and $Sb_2O_3$ is of 0–4%, preferably, 0–1%.

When $Sb_2O_3$ should be contained in the glass, $TiO_2$ is of 0–5%, preferably, 0–2%, PbO is of 0–10%, preferably, 0–5.5%, and $Sb_2O_3$ is of 0.1–4%, preferably, 0.2–1%.

In any cases described above, when $TiO_2$ is more than the upper limit content, an undesired colored glass is produced. Furthermore, transparent and homogeneous glass can hardly be obtained because the liquidus temperature is too high.

When PbO is more than the upper limit content, the glass is easily colored similar to $TiO_2$. Furthermore, homogeneous glass can not be obtained because of vaporization of PbO in melting, which is undesired for the environment.

When $Sb_2O_3$ is more than the upper limit content, homogeneous glass can not be obtained.

When PbO and $Sb_2O_3$ are excessively contained in the glass, the glass is made to be colored brown or black at a heat treatment in the manufacturing process of the fluorescent lamp. This is not desired for fluorescent lamp.

The reason why the CTE of the glass is limited to $34$–$43 \times 10^{-7}$/°C. at 30°–380° C. is as follows. Out of the above-mentioned range, the glass tube suffers from a slow leak and/or a crack to damage the fluorescent lamp owing to mismatch with the CTE of tungsten metal.

When the glass of the present invention is used for a fluorescent lamp which uses lead wires made of Kovar, it is preferable that the glass consists essentially of $SiO_2$ 55–73%, $B_2O_3$ 15.2–25%, $Al_2O_3$ 1–10%, $Li_2O+Na_2O+K_2O$ 4–16%. $ZrO_2$ 0.01–5%, $TiO_2$+PbO+$Sb_2O_3$ 0.05–11%. The glass has a CTE of $43$–$55 \times 10^{-7}$/°C. at 30°–380° C.

The following is the reason why the contents are limited to as above-mentioned.

$SiO_2$ is a network former. The content of $SiO_2$ is 55 to 73%, preferably, 61–72%. When the content of $SiO_2$ is more than 73%, the CTE becomes too low for Kovar sealing and the glass becomes difficult to be melted. When the content of $SiO_2$ is less than 55%, chemical durability becomes worse to cause weathering, which results lowering a luminance of the fluorescent lamp using the glass.

$B_2O_3$ is an ingredient required to make the glass easy melting and to adjust viscosity, and is of 15.2–25%, preferably 16–24%. When the content of $B_2O_3$ is more than 25%, viscosity becomes too low and homogeneous glass can not be obtained because of vaporization of $B_2O_3$. Chemical durability also becomes worse. When the content of $B_2O_3$ is less than 15.2%, melting becomes difficult and viscosity becomes too high for Kovar sealing.

$Al_2O_3$ is an ingredient for stabilizing the glass, the content of which is 1–10%, preferably, 1–4.9%. When the content of $Al_2O_3$ is more than 10%, melting becomes difficult. When the content of $Al_2O_3$ is less than 1%, the liquidus temperature is too high so that it is difficult to produce homogenous glass. Moreover, chemical durability becomes low.

Alkali metal oxides of $Li_2O$, $Na_2O$, and $K_2O$ are ingredients to make it easy to melt the glass and to adjust the CTE and viscosity.

The total content of alkali metal oxides is 4–16%, preferably, 5.1–13%. When the total content of alkali metal oxides is more than 16%, the CTE and the viscosity become too high for Kovar sealing and the chemical durability becomes extremely low. When the total content is less than 4%, the CTE is too low.

With respect to content of each of alkali metal oxides, $Li_2O$ is 0–4%, preferably, 0–3%, $Na_2O$ is 0–4.5%, preferably, 0–3.9%, and $K_2O$ is 0–15%, preferably, 0–13%.

When the content of $Li_2O$ is more than 4%, devitrification is readily caused and the CTE becomes too high.

When the content of $Na_2O$ is more than 4.5%, $Na^+$ ions contaminate the fluorescent substance at a heating step during the manufacturing process of the fluorescent lamp to make the luminance lower, and the CTE becomes too high.

When the content of $K_2O$ is more than 15%, the CTE becomes too high.

$ZrO_2$ is an ingredient to improve the chemical durability, the content of which is 0.1–5%, preferably, 0.1–3%.

When the content of $ZrO_2$ is more than 5%, devitrification is readily caused to make the glass inhomogeneous. Therefore, in production of the glass tube, accuracy of dimension becomes worse, and a defect of appearance occurs. Accordingly, the high quality of the glass tube can not be obtained. On the other hand, when the content of $ZrO_2$ is less than 0.01%, chemical durability becomes worse to cause the weathering of the glass. This makes it difficult to apply a uniform fluorescent substance layer onto the glass tube.

$TiO_2$, PbO, and $Sb_2O_3$ are ingredients for giving the glass a high solarization resistance against ultraviolet ray. The total content of them is 0.05–11%, preferably, 0.1–5.5%.

When the total content is more than 11%, an influence of devitrification and vaporization is strengthened to make it difficult to obtain homogeneous glass tube having a dimensional accuracy. On the other hand, when the total content is less than 0.05%, the solarization resistance can not be obtained.

When $TiO_2$ should be contained in the glass, $TiO_2$ is of 0.05–5%, preferably, 0.1–3%, PbO is of 0–10%, preferably, 0–5.5%, and $Sb_2O_3$ is of 0–4%, preferably, 0–1%.

When PbO should be contained in the glass, $TiO_2$ is of 0–5%, preferably, 0–2%, PbO is of 0.05–10%, preferably, 0.1–5.5%, and $Sb_2O_3$ is of 0–4%, preferably, 0–1%.

When $Sb_2O_3$ should be contained as in the glass, $TiO_2$ is of 0–5%, preferably, 0–2%, PbO is of 0–10%, preferably, 0–5.5%, and $Sb_2O_3$ is of 0.1–4%, preferably, 0.2–1%.

In any cases described above, when the content of $TiO_2$ is more than the upper limit amount, the glass is easily colored.

Furthermore, transparent and homogeneous glass can hardly be obtained because the liquidus temperature is too high.

When PbO is more than the upper limit amount, the glass is easily colored similar to $TiO_2$. Furthermore, homogeneous glass can not be obtained because of vaporization of PbO during a melting process.

When $Sb_2O_3$ is more than the upper limit amount, homogeneous glass can not be obtained.

When PbO and $Sb_2O_3$ are excessively contained in the glass, the glass is colored brown or black during a heating treatment in a manufacture process of the fluorescent lamp. This is not desired for the fluorescent lamp.

The reason why the CTE is limited to $43\text{–}55\times10^{-7}/°C$. at 30°–380° C. is as follows. Out of the above-mentioned range, the glass tube suffers from slow leak and/or cracks to damage the fluorescent lamp owing to mismatch with the CTE of the Kovar alloy.

The glass of the present invention may contain SrO, BaO, CaO, MgO, ZnO, $P_2O_5$, $As_2O_3$, $SO_3$, $F_2$, $Cl_2$, or the other at an appropriate amount, for sake of improvement in adjustment of glass viscosity, chemical durability, easy melt, and refining.

The following description will be made as regards examples according to the present invention.

EXAMPLE 1

Tables 1 to 3 show samples Nos. 1 to 13 according to the present invention and comparative sample No. 14.

Each of the samples shown in Tables was prepared as follows.

The glass batch were blended to be a composition of each sample as shown in Tables. Thereafter, the glass batch sample materials blended was melted into a molten glass in a platinum crucible at 1500° C. for 5 hours. The molten glass was formed and worked into a predetermined shape. Thus, each of samples was obtained, and was then subjected to measurement of a CTE at 30° to 380° C. and of spectral transmittance before and after irradiation of ultraviolet ray. The measured properties are shown in Tables 1–3.

As will be noted from the Tables, samples Nos. 1–13 of the present invention have a CTE of $36.5\text{–}40.1\times10^{-7}/°C$. which is matched with that of tungsten metal. Furthermore, decrease of the light transmittance after irradiation of ultraviolet is about 1% or less. Therefore, it is understood that the samples according to the present invention has high solarization resistance against the ultraviolet ray.

On the other hand, comparative sample No. 14 has a CTE of $38.0\times10^{-7}/°C$. which is capable of sealing the tungsten metal. However, since the comparative sample contains none of $TiO_2$, PbO, and $Sb_2O_3$, it is high in reduction of the light transmittance after the irradiation of ultraviolet ray. Therefore, it is understood that comparative sample has low solarization resistance against ultraviolet ray.

TABLE 1

| | SAMPLE NO. | | | | |
|---|---|---|---|---|---|
| | 1 | 2 | 3 | 4 | 5 |
| GLASS COMPOSITION (wt %) | | | | | |
| $SiO_2$ | 73.7 | 75.2 | 75.3 | 74.8 | 73.3 |
| $B_2O_3$ | 16.2 | 16.2 | 16.2 | 16.2 | 16.2 |
| $Al_2O_3$ | 1.3 | 1.3 | 1.3 | 1.3 | 1.3 |
| $Li_2O$ | — | — | — | — | — |
| $Na_2O$ | 4.1 | 4.1 | 4.0 | 4.0 | 4.1 |
| $K_2O$ | 1.6 | 1.6 | 1.6 | 1.6 | 1.5 |
| $ZrO_2$ | 0.1 | 0.2 | 0.1 | 0.1 | 0.2 |
| $TiO_2$ | 1.0 | — | — | 1.0 | 2.5 |
| PbO | 1.0 | — | 0.5 | — | — |
| $Sb_2O_3$ | — | 0.5 | — | — | — |
| MgO | 0.2 | 0.2 | 0.4 | 0.3 | 0.3 |
| CaO | 0.8 | 0.7 | 0.6 | 0.7 | 0.6 |
| CTE [30–380° C.] ($\times 10^{-7}/°C.$) | 39.8 | 38.6 | 38.4 | 38.6 | 39.6 |
| DECREASE OF LIGHT TRANSMITTANCE AFTER IRRADIATION OF UV RAY (%) | 0.1 | 1.0 | 0.9 | 0.5 | 0.2 |

TABLE 2

| | SAMPLE NO. | | | | |
|---|---|---|---|---|---|
| | 6 | 7 | 8 | 9 | 10 |
| GLASS COMPOSITION (wt %) | | | | | |
| $SiO_2$ | 75.0 | 77.5 | 73.1 | 74.4 | 74.1 |
| $B_2O_3$ | 16.2 | 14.0 | 18.5 | 14.1 | 15.8 |
| $Al_2O_3$ | 1.3 | 2.2 | 2.2 | 1.0 | 3.5 |
| $Li_2O$ | 1.0 | — | — | 0.1 | — |
| $Na_2O$ | 3.5 | 4.0 | 1.0 | 3.2 | 4.5 |
| $K_2O$ | 0.9 | 1.6 | 4.0 | 1.8 | 1.3 |
| $ZrO_2$ | 0.1 | 0.2 | 0.2 | 0.1 | 0.1 |
| $TiO_2$ | 1.0 | 0.5 | — | — | 0.5 |
| PbO | — | — | — | 5.3 | — |
| $Sb_2O_3$ | — | — | 1.0 | — | — |
| MgO | 0.7 | — | — | — | 0.2 |
| CaO | 0.3 | — | — | — | — |
| CTE [30–380° C.] ($\times 10^{-7}/°C.$) | 40.0 | 36.5 | 37.5 | 37.7 | 38.0 |
| DECREASE OF LIGHT TRANSMITTANCE AFTER IRRADIATION OF UV RAY (%) | 0.5 | 0.6 | 0.4 | 0.1 | 0.6 |

TABLE 3

| | SAMPLE NO. | | | |
|---|---|---|---|---|
| | 11 | 12 | 13 | 14 |
| GLASS COMPOSITION (wt %) | | | | |
| $SiO_2$ | 74.5 | 76.6 | 73.3 | 75.7 |
| $B_2O_3$ | 14.2 | 14.0 | 16.1 | 16.2 |
| $Al_2O_3$ | 0.9 | 2.2 | 1.3 | 1.3 |
| $Li_2O$ | — | — | — | — |
| $Na_2O$ | 3.2 | 4.1 | 4.1 | 4.1 |
| $K_2O$ | 1.7 | 1.6 | 1.6 | 1.6 |
| $ZrO_2$ | 0.1 | 1.0 | 0.1 | 0.1 |
| $TiO_2$ | 1.0 | 0.5 | 0.5 | — |
| PbO | 4.3 | — | 1.5 | — |

TABLE 3-continued

| | SAMPLE NO. | | | |
|---|---|---|---|---|
| | 11 | 12 | 13 | 14 |
| $Sb_2O_3$ | 0.1 | — | 0.5 | — |
| MgO | — | — | 0.3 | 0.3 |
| CaO | — | — | 0.7 | 0.7 |
| CTE [30–380° C.] ($\times 10^{-7}/°C$.) | 38.1 | 36.9 | 40.1 | 38.0 |
| DECREASE OF LIGHT TRANSMITTANCE AFTER IRRADIATION OF UV RAY (%) | 0.2 | 0.8 | 0.4 | 7.5 |

The CTE was measured by a self-recorded differential thermography at 30°–380° C. as a mean expansion coefficient of sample items each having a diameter of 3 mm and a length of 50 mm.

The solarization resistance against ultraviolet ray was evaluated as follows.

A sample glass plate was prepared with a thickness of 1 mm with both surfaces being polished to a mirror. The sample glass plate was subjected to measure a wavelength at which the sample glass plate had a light transmittance of 80%. Furthermore, the sample glass plate was irradiated for 1 hour by an ultraviolet ray with a main wavelength of 253.7 nm from a low pressure mercury lamp of 40 watt. Thereafter, the sample glass plate was subjected to measurement of the light transmittance for a light of the wavelength at which it had, before irradiation of ultraviolet ray, the light transmittance of 80% are represented. The difference between the light transmittance before and after the irradiation of the ultraviolet ray was calculated as the decrease of the light transmittance.

It is important for the glass used for the fluorescent lamp as a backlight for LCDs that the glass is high in the ultraviolet solarization resistance and therefore low in the decrease of the transmittance.

EXAMPLE 2

Tables 4 to 7 show samples Nos. 15 to 32 according to the present invention and a comparative sample No. 33.

TABLE 4

| | SAMPLE NO. | | | | |
|---|---|---|---|---|---|
| | 15 | 16 | 17 | 18 | 10 |
| GLASS COMPOSITION (wt %) | | | | | |
| $SiO_2$ | 67.9 | 63.8 | 70.9 | 64.2 | 64.1 |
| $B_2O_3$ | 18.7 | 18.7 | 16.0 | 18.0 | 21.7 |
| $Al_2O_3$ | 3.3 | 1.3 | 3.0 | 8.6 | 6.2 |
| $Li_2O$ | 0.9 | 1.1 | 0.9 | 0.5 | 0.6 |
| $Na_2O$ | 0.4 | 0.4 | 0.4 | 2.2 | 3.2 |
| $K_2O$ | 8.2 | 8.2 | 8.2 | 3.0 | 2.6 |
| $ZrO_2$ | 0.5 | 1.0 | 0.1 | 0.1 | 0.1 |
| $TiO_2$ | 0.1 | 5.0 | 0.5 | 1.0 | 0.5 |
| PbO | — | 0.5 | — | — | — |
| $Sb_2O_3$ | — | — | — | — | — |
| BaO | — | — | — | 2.4 | 1.0 |
| CTE [30–380° C.] ($\times 10^{-7}/°C$.) | 48.1 | 51.5 | 48.5 | 45.5 | 45.4 |
| DECREASE OF LIGHT TRANSMITTANCE AFTER IRRADIATION OF UV RAY (%) | 1.0 | 0.2 | 0.5 | 0.4 | 0.5 |

TABLE 5

| | SAMPLE NO. | | | | |
|---|---|---|---|---|---|
| | 20 | 21 | 22 | 23 | 24 |
| GLASS COMPOSITION (wt %) | | | | | |
| $SiO_2$ | 67.0 | 66.7 | 62.8 | 66.5 | 67.5 |
| $B_2O_3$ | 17.5 | 17.5 | 18.7 | 18.7 | 18.7 |
| $Al_2O_3$ | 3.3 | 3.3 | 3.3 | 3.3 | 3.3 |
| $Li_2O$ | — | 3.1 | 1.0 | 0.9 | 0.9 |
| $Na_2O$ | — | 0.2 | 0.4 | 0.4 | 0.4 |
| $K_2O$ | 11.0 | 7.7 | 8.2 | 8.2 | 8.2 |
| $ZrO_2$ | 0.2 | 0.5 | 0.5 | 0.5 | 0.5 |
| $TiO_2$ | 1.0 | 0.7 | 0.1 | — | — |
| PbO | — | 0.3 | 5.0 | 1.5 | 0.5 |
| $Sb_2O_3$ | — | — | — | — | — |
| BaO | — | — | — | — | — |
| CTE [30–380° C.] ($\times 10^{-7}/°C$.) | 54.6 | 53.1 | 49.8 | 49.6 | 48.3 |
| DECREASE OF LIGHT TRANSMITTANCE AFTER IRRADIATION OF UV RAY (%) | 0.3 | 0.5 | 0.3 | 0.5 | 0.8 |

TABLE 6

| | SAMPLE NO. | | | | |
|---|---|---|---|---|---|
| | 25 | 26 | 27 | 28 | 29 |
| GLASS COMPOSITION (wt %) | | | | | |
| $SiO_2$ | 68.0 | 63.8 | 63.7 | 67.0 | 63.8 |
| $B_2O_3$ | 16.0 | 18.0 | 21.7 | 18.7 | 18.0 |
| $Al_2O_3$ | 3.0 | 8.6 | 6.2 | 3.3 | 8.6 |
| $Li_2O$ | 0.9 | 0.5 | 0.6 | 0.9 | 0.5 |
| $Na_2O$ | 0.4 | 2.2 | 3.2 | 0.4 | 2.2 |
| $K_2O$ | 8.2 | 3.0 | 2.6 | 8.2 | 3.0 |
| $ZrO_2$ | 3.0 | 0.5 | 0.5 | 0.5 | 0.5 |
| $TiO_2$ | — | — | — | — | — |
| PbO | 0.5 | 1.0 | 0.5 | — | — |
| $Sb_2O_3$ | — | — | — | 1.0 | 1.0 |
| BaO | — | 2.4 | 1.0 | — | 2.4 |
| CTE [30–380° C.] ($\times 10^{-7}/°C$.) | 49.5 | 45.6 | 45.5 | 49.2 | 45.3 |
| DECREASE OF LIGHT TRANSMITTANCE AFTER IRRADIATION OF UV RAY (%) | 0.5 | 0.4 | 0.5 | 0.8 | 0.7 |

TABLE 7

| | SAMPLE NO. | | | |
|---|---|---|---|---|
| | 30 | 31 | 32 | 33 |
| GLASS COMPOSITION (wt %) | | | | |
| $SiO_2$ | 66.5 | 63.8 | 66.7 | 68.0 |
| $B_2O_3$ | 18.7 | 18.0 | 17.5 | 18.7 |
| $Al_2O_3$ | 3.3 | 8.6 | 3.3 | 3.3 |
| $Li_2O$ | 0.9 | 0.5 | 3.1 | 0.9 |
| $Na_2O$ | 0.4 | 2.2 | 0.2 | 0.4 |
| $K_2O$ | 8.2 | 3.0 | 7.7 | 8.2 |
| $ZrO_2$ | 0.5 | 0.5 | 0.5 | 0.5 |
| $TiO_2$ | 0.5 | — | 0.7 | — |
| PbO | 0.5 | 0.5 | — | — |
| $Sb_2O_3$ | 0.5 | 0.5 | 0.3 | — |
| BaO | — | — | — | — |
| CTE [30–380° C.] ($\times 10^{-7}/°C$.) | 49.1 | 48.3 | 52.8 | 48.4 |

TABLE 7-continued

| | SAMPLE NO. | | | |
| --- | --- | --- | --- | --- |
| | 30 | 31 | 32 | 33 |
| DECREASE OF LIGHT TRANSMITTANCE AFTER IRRADIATION OF UV RAY (%) | 0.6 | 0.8 | 0.6 | 8.5 |

Each of the samples shown in Tables was prepared in a similar manner to Example 1 and was subjected to measurement of the CTE at 30°–380° C. and of spectral transmittance before and after irradiation of ultraviolet ray. The measured properties are shown in Tables 4–7. As shown in the Tables, it is obvious that samples Nos. 15–32 have a CTE of $45.3$–$54.6 \times 10^{-7}$/°C. which is matched with that of Kovar alloy.

Furthermore, it is understood that samples Nos. 15–32 have reduction of the light transmittance of 1% or less and a high solarization resistance against ultraviolet ray.

On the other hand, the comparative sample No. 33 also has a CTE within a range of $43$–$55 \times 10^{-7}$/°C., and can, therefore, seal Kovar alloy.

However, since the comparative sample No. 33 contains none of $TiO_2$, $PbO_2$, and $Sb_2O_3$, the reduction of the light transmittance after irradiation of ultraviolet ray is 8.5%. It is understood that the comparative sample is low in the solarization resistance against the ultraviolet ray.

It will be understood from the above description that the glass of the invention is excellent in use for glass tubes of fluorescent lamps with a small diameter as a light source of the LCD, because the glass has a CTE suitable for sealing the tungsten metal and the Kovar alloy and a high solarization resistance against ultraviolet ray.

Therefore, a glass tube with small diameter for a fluorescent lamp as a light source in the LCD is made of the glass of the present invention and has a high solarization resistance against ultraviolet ray to protect the LCD resulted from glass-coloring from lowering in quality.

What is claimed is:

1. A glass used for a fluorescent lamp consisting essentially, by weight, of $SiO_2$ 55–79%, $B_2O_3$ 12.5–25%, $Al_2O_3$ 0.5–10%, $Li_2O+Na_2O+K_2O$ 1–16%, $ZrO_2$ 0.01–5%, and $TiO_2+PbO+Sb_2O_3$ 0.05–11%.

2. A glass as claimed in claim 1, said glass material consisting essentially, by weight, of $SiO_2$ 73–79%, $B_2O_3$ 12.5–25%, $Al_2O_3$ 0.5–10%, $Li_2O+Na_2O+K_2O$ 1–11%, $ZrO_2$ 0.01–5%, and $TiO_2+PbO+Sb_2O_3$ 0.05–11%, said glass having a linear coefficient of thermal expansion of $34$–$43 \times 10^{-7}$/°C. at 30°–380° C. and being capable of sealing with tungsten metal.

3. A glass as claimed in claim 2, said glass material consisting essentially, by weight, of $SiO_2$ 73–78%, $B_2O_3$ 14–22%, $Al_2O_3$ 1–2.2%, $Li_2O+Na_2O+K_2O$ 5.1–9%, $ZrO_2$ 0.1–3%, and $TiO_2+PbO+Sb_2O_3$ 0.1–5.5%.

4. A glass as claimed in claim 1, said glass consisting essentially, by weight, of $SiO_2$ 55–73%, $B_2O_3$ 15.2–25%, $Al_2O_3$ 1–10%, $Li_2O+Na_2O+K_2O$ 4–16%, $ZrO_2$ 0.01–5%, and $TiO_2+PbO+Sb_2O_3$ 0.05–11%, said glass having a linear coefficient of thermal expansion of $43$–$55 \times 10^{-7}$/°C. and being capable of sealing with Fe—Ni—Co alloy.

5. A glass as claimed in claim 4, said glass material consisting essentially, by weight, of $SiO_2$ 61–72%, $B_2O_3$ 16–24%, $Al_2O_3$ 1–4.9%, $Li_2O+Na_2O+K_2O$ 5.1–13%, $ZrO_2$ 0.1–3%, and $TiO_2+PbO+Sb_2O_3$ 0.1–5.5%.

6. A glass tube for a fluorescent lamp which is made of a glass as claimed in claim 1.

* * * * *